US009823637B2

(12) United States Patent
Rostron et al.

(10) Patent No.: US 9,823,637 B2
(45) Date of Patent: Nov. 21, 2017

(54) FAULT DETECTION AND ISOLATION USING A COMMON REFERENCE CLOCK

(71) Applicant: Southern States, LLC, Hanmpton, GA (US)

(72) Inventors: Joseph R. Rostron, McDonnough, GA (US); Fan Jiyuan, Hampton, GA (US)

(73) Assignee: Southern States, LLC, Hampton, GA (US)

( * ) Notice: Subject to any disclaimer, the term of this patent is extended or adjusted under 35 U.S.C. 154(b) by 650 days.

(21) Appl. No.: 14/477,995

(22) Filed: Sep. 5, 2014

(65) Prior Publication Data

US 2016/0072270 A1 Mar. 10, 2016

(51) Int. Cl.
*G05B 15/02* (2006.01)
*H02H 3/08* (2006.01)
*H02H 1/00* (2006.01)
*G05D 3/12* (2006.01)

(52) U.S. Cl.
CPC .............. *G05B 15/02* (2013.01); *H02H 3/081* (2013.01); *H02H 1/003* (2013.01)

(58) Field of Classification Search
CPC ......... G05B 15/02; H02H 3/081; H02H 1/003
USPC ........................................................ 700/294
See application file for complete search history.

(56) References Cited

U.S. PATENT DOCUMENTS

| 4,084,103 | A  | * | 4/1978  | Burns, III    | H02M 3/157 307/132 EA |
| 6,574,740 | B1 | * | 6/2003  | Odaohhara     | G06F 1/32 713/320 |
| 7,096,175 | B2 | * | 8/2006  | Rehtanz       | H02J 3/24 700/293 |
| 7,725,295 | B2 | * | 5/2010  | Stoupis       | G01R 31/024 324/527 |
| 8,554,382 | B2 | * | 10/2013 | Hindi         | H02J 3/14 700/29 |
| 8,849,737 | B1 | * | 9/2014  | Engler        | G06N 5/02 706/13 |
| 2002/0135962 | A1 | * | 9/2002 | Tang         | G06F 1/305 361/111 |
| 2005/0050398 | A1 | * | 3/2005 | Rao          | G06F 11/0709 714/39 |

(Continued)

*Primary Examiner* — Ryan Coyer
(74) *Attorney, Agent, or Firm* — Mehrman Law Office; Michael J. Mehrman

(57) ABSTRACT

A fault detection and isolation system for distribution electric power lines utilizing a remote reference voltage signal, multiple three-phase current monitors producing asynchronous event data, and a common reference clock. A voltage measurement obtained for a power line at a substation may be synchronized with multiple current phase measurements taken at a power monitoring location along that particular power line. The same voltage measurement may be similarly synchronized with current measurements taken at multiple current monitoring locations along the power line. As a result, the same voltage measurement may be synchronized with current measurements taken multiple tap points along the power allowing a fault on a tapped line segment to be identified, located and isolated. An alternative embodiment utilizes differential current analysis utilizing current measurements from adjacent current monitoring locations correlated to a common reference clock to locate faults and therefore does not require a voltage measurement.

20 Claims, 12 Drawing Sheets

(56) References Cited

U.S. PATENT DOCUMENTS

| | | | |
|---|---|---|---|
| 2005/0099747 A1* | 5/2005 | Zima | G05B 13/048 361/62 |
| 2011/0125293 A1* | 5/2011 | Havlena | G05B 13/048 700/30 |
| 2012/0062239 A1* | 3/2012 | Rostron | H02H 7/26 324/543 |
| 2013/0113285 A1* | 5/2013 | Hyde | H02J 3/14 307/35 |

* cited by examiner

FAULT DETECTION AND ISOLATION USING A COMMON REFERENCE CLOCK

REFERENCE TO RELATED APPLICATIONS

This application incorporates by reference U.S. patent application Ser. No. 12/864,611 (Pub. No. 2013-0229735) entitled "High-Impedance Fault Detection and Isolation System" filed Apr. 17, 2013; Ser. No. 13/229,808 (Pub. No. 2012-0062239) entitled "Directional Fault Sectionalizing System" filed Sep. 12, 2011; and U.S. Provisional Patent Application Ser. No. 61/381,518 entitled "Fault Location Detection on Tapped Transmission Lines," filed Sep. 10, 2010. Commonly owned U.S. Pat. Nos. 7,191,074; 7,683,798; 8,392,130; and 8,659,862 are also incorporated by reference.

TECHNICAL FIELD

The present invention is directed to electric power systems and, more particularly, to an electric power line fault detection and isolation system utilizing multiple three-phase current monitors producing asynchronous event data correlated to a common reference clock.

BACKGROUND

Line mounted fault detectors (also known as faulted circuit indicators or FCI's) are used in distribution circuits to identify electric power lines where high current faults have occurred. Overcurrent detectors in distribution voltage circuits at electric utilities are commonly used to detect faults that produce significant increases in current. This works well for many faults because many distribution circuit faults cause currents well in excess of the normal load current. An FCI is commonly mounted directly to an individual phase conductor and is usually installed there by a technician using an insulating stick called a "hot stick" to install and remove the device from the power line while the conductor remains energized.

Although conventional FCI are effective at detecting low-impedance, high-current faults, they are not effective for detecting high-impedance, low-current faults even when they send their information to a common monitoring point. This is because high-impedance faults, for example where the fault current is less than about 1.5 times the normal current, remain below the triggering threshold of the overcurrent FCI. As a result, conventional FCI technologies only detect and report high-current fault events.

Some FCIs have the capability of storing data logs and providing "event" reports giving full current waveform data, with each FCI providing a log for its associated phase conductor (i.e., event reporting on a single-phase basis). In addition, there are conventional overcurrent devices with the ability to determine the location of faults on radial lines, but they only trigger for high-current faults. As a result, virtually all of the current technologies utilized on power lines for detecting and locating low-impedance, high-current faults are ineffective for detecting high-impedance, low-current faults.

For high-impedance fault detection, conventional approaches used in substations require the use of three synchronized current sensors and synchronized voltage signals to determine the existence of a high-impedance fault. But even with three-phase synchronized information available, conventional technology is not capable of determining the location of the fault or isolating the specific line segment where the fault has occurred on power lines with multiple tap points. Moreover, existing fault monitoring techniques located between the substations are not able to detect the presence of high-impedance faults, which limits high-impedance fault location detection to devices located in substations.

High-impedance faults can generally be defined as faults where the fault current is less than about 1.5 times normal phase current. Current FCI technology used for overcurrent protection is typically not capable of providing any indication of the presence these high-impedance faults. When high-impedance faults occur, which in about 70% of faults, they present significant safety concerns to the public because they are often caused by energized lines touching trees or broken, still energized lines touching the ground creating significant electrical hazards. Since high-impedance faults are not detectable by conventional overcurrent FCI sensors, their location can be nearly impossible to find. At present, while detection at substations is possible, determination of the location down to a specific segment of distribution line is presently accomplished in most cases by visual inspection of arcing or the fires they cause.

Single-phase current monitors are not capable of determining the location of these dangerous high-impedance faults. While some currently available techniques have been used to detect the presence of high-impedance faults by detecting a harmonic signature characteristic of a fault caused by "arcing" in the faults, these techniques do not determine the location or direction to the fault. Finding the location of the fault requires some hint at which direction the fault is located otherwise the entire line must be inspected. In addition, visual inspection also has limits because things like cracks in insulators can be difficult to find visually, for example when a crack is on the other side of the insulator from the line of sight.

The result is that a distribution circuit can experience a high-impedance fault and the utility crew may not be able to even detect the presence of the fault because the overcurrent detectors typically installed on distribution lines do not respond to the current levels created by the high-impedance fault. Even when more sophisticated (and expensive) equipment is installed to detect the presence of high-impedance faults, the location or the direction to the fault from the monitoring equipment cannot be detected. With currently available technology, detecting the location or the direction to the fault from the monitoring equipment presently requires even more expensive solutions.

As a result, there is a persistent need for a lower cost solution to detecting, locating and isolating faults, including but not limited to high-impedance faults, on distribution circuits to increase adoption of the technology and achieve the associated public safety benefits.

SUMMARY OF THE INVENTION

The present invention meets the needs described above through a fault detection and isolation system for distribution electric power lines utilizing a remote reference voltage signal, multiple three-phase current monitors producing asynchronous event data, and a common reference clock. A voltage measurement obtained for a power line at a substation may be synchronized with multiple current phase measurements taken at a power monitoring location along that particular power line. The same voltage measurement may be similarly synchronized with current measurements taken at multiple current monitoring locations along the power line. As a result, the same voltage measurement may be synchronized with current measurements taken multiple tap points along the power allowing a fault on a tapped line segment to be identified, located and isolated. An alternative embodiment utilizes differential current analysis utilizing current measurements from adjacent current monitoring locations correlated to a common reference clock to locate faults and therefore does not require a voltage measurement.

In view of the foregoing, it will be appreciated that the present invention provides an improved fault isolation system for a three phase electric power circuit. The specific structures and techniques for accomplishing the advantages described above will become apparent from the following detailed description of the embodiments and the appended drawings and claims.

DETAILED DESCRIPTION OF THE EMBODIMENTS

Figure 1:
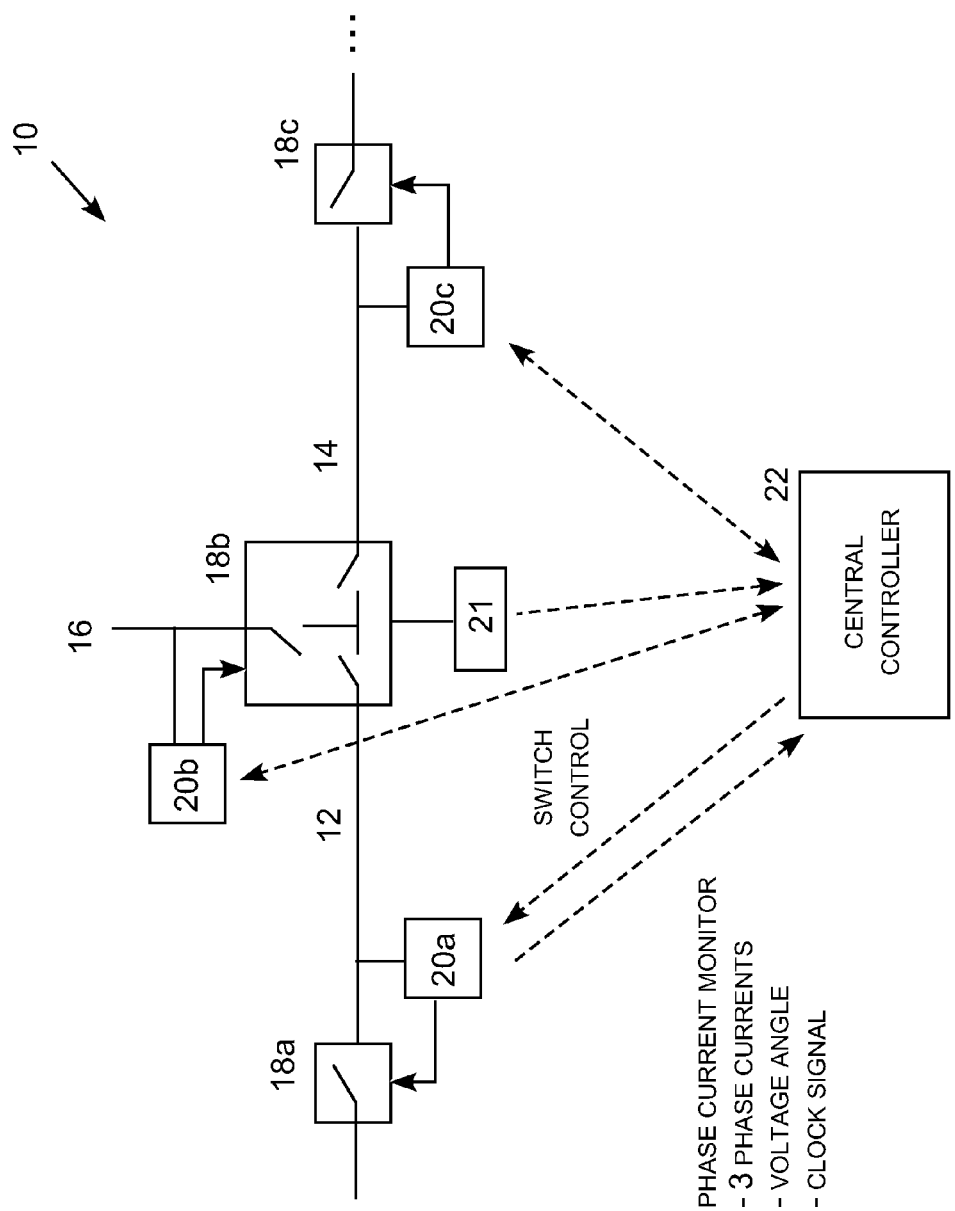
FIG. 1 is a one line diagram of a high-impedance fault detection and isolation system using distributed line-mounted phase current sensors.

The present invention may be embodied in a fault detection and isolation system for distribution electric power lines utilizing a remote reference voltage signal, multiple three-phase current monitors producing asynchronous event data, and a common reference clock. Specific techniques for detecting the presence of high-impedance faults using simultaneous three-phase current monitors are described in U.S. Pat. No. 8,717,721; specific techniques for determining the direction to the fault from the sequenced currents are described in U.S. patent application Ser. No. 13/229,808; and specific techniques for sectionalizing the distribution network to isolate detected faults are described in U.S. Pat. No. 8,659,862, which are incorporated by reference. U.S. patent application Ser. No. 13/864,611, which is also incorporated by reference, describes a high-impedance fault detection system utilizing local current monitors and a local voltage angle detector.

While the techniques described in these prior applications can be used to successfully detect, locate and respond to high-impedance faults, obtaining synchronized three-phase current and voltage monitoring data can be a relatively expensive solution. In many cases, the market for distribution switchgear is sufficiently price sensitive to block this solution despite the known risks of high-impedance faults to public safety. These same issues exist in the application of single-phase current sensor devices to underground cables. The present invention provides a less expensive alternative through the use of asynchronous, line-mounted single-phase current and voltage sensors with rolling data logs and a common clock or other "event trigger" to synchronize the signals to a common time scale whenever a fault event is detected. The single phase current waveforms are then computationally sequenced and analyzed to verify the occurrence of a high-impedance fault, identify the faulted phase, and determine the directionality of the fault.

The use of asynchronous, single-phase current and voltage angle sensors with rolling data logs correlated with a common clock or event trigger to synchronize the signals to common time scale whenever a fault event is detected, avoids the need for simultaneous three-phase current and voltage measurement. Importantly, removing the requirement for synchronous three-phase current monitoring allows conventional line-mounted, single-phase current sensors to be utilized. This modification produces significant savings allowing the high-impedance fault detectors to be included at more monitoring stations in the distribution network including many more sectionalizing switch locations away from the substations, producing more robust high-impedance fault isolation capability and improved network safety.

In the present invention, the synchronous three-phase current monitoring device described in U.S. Pat. No. 8,717,721 is replaced with three asynchronous, line-mounted, single-phase current sensors that each maintain their own rolling data logs of their respective phase current waveforms. To provide fault directionality, an asynchronous, line-mounted single-phase voltage angle sensor may also maintain a rolling data log of the voltage angle waveform. Detection of a potential fault event triggers the data logs to be stored locally and uploaded to a controller for computational analysis. Each event data log includes the recent asynchronous phase current (and optionally voltage angle) waveform history just prior to and immediately following the triggering event and may also include a common time reference, such as a GPS clock signal acquired by the sensor and recorded as part of its data log file. The controller receives the waveform data filed from the various sensors and computationally analyzes the event data using the event trigger or a synchronizing clock signal to place the phase current and voltage angle waveforms on a common time scale.

Once the phase current and voltage angle waveforms have been placed on a common time scale, the computational sequencing and analysis techniques described in U.S. patent application Ser. No. 13/229,808 (Pub. No. 2012-0062239)

are implemented to locate the fault. The techniques described in U.S. Pat. No. 8,659,862 are then implemented to sectionalize the distribution network to isolate the fault. U.S. patent application Ser. No. 13/864,611 (Pub. No. 2013-0229735) describes the use of a reference clock, a local voltage angle sensor, and three local phase current monitor to detect and determine the direction to an electric power fault. The present disclosure extends that approach to utilizing a reference clock, a single voltage angle sensor, and multiple three-phase current monitors positioned at number of locations along the power line to detect and isolate an electric power fault. An alternative embodiment utilizes differential current analysis utilizing current measurements from adjacent current monitoring locations correlated to a common reference clock to locate faults and therefore does not require a voltage measurement.

The asynchronous event data (independent single-phase phase current measurements) obtained from the individual phase current sensors are typically computationally combined and sequenced using a common reference clock signal, such as a GPS or local clock acquired by the sensors themselves or a local remote transmission unit (RTU) serving the sensors, to compute the magnitude and phase angle of the neutral current (or zero-sequence current) with sufficient accuracy to detect the presence of a high-impedance fault, determine which phase is faulted, and (if desired with an additional voltage angle measurement, typically at a remote location such as the substation serving the power line) the direction to the fault from the current monitoring equipment to localize the fault. That is, the location of the fault is determined with the precision of being located between two adjacent current monitoring locations.

An event trigger may be detected by any current sensor (or the voltage angle sensor, if present), which sends a "wake-up" call to the other sensors causing all three phase current sensors (and the voltage angle sensor, if present) to respond. If the sensors are not configured to record a GPS clock signal, the wake-up call causes each sensor to generate a simultaneous event time mark. Each device also locally saves and uploads the contents of the data log to a controller, which is typically located at the monitoring site or at a remote control location. The triggering event can be any single-phase current sensor detecting an extended current-zero condition sufficiently longer than a normal zero crossing to indicate operation of a breaker or circuit recloser. The extended current-zero condition can be used as the triggering event because many high-impedance faults involve an initial current surge that is cleared through breaker or circuit recloser operation, which may reenergize the faulted line even though the high-impedance fault condition remains. The invention steps in at this point, causing an upload of the recent event logs and computational analysis of the phase currents to determine whether a high-impedance fault has in fact occurred and, if so, the identity of the faulted pause and the directionality of the high-impedance fault from the monitoring location. Any other unusual change in a phase current characteristic of a high-impedance fault may also be used as an event trigger. For example, an abrupt or transient current change, significant harmonic content or other waveform distortion, or unusual change in the amplitude or phase angle of the phase current may also be detected as triggering events. The system may err on the side of event detection, since event detection only triggers a data upload and analysis procedure to confirm whether a high-impedance fault has actually occurred, and actual switch operation only occurs after the computational analysis has confirmed that the high-impedance fault has actually occurred.

While the use of a synchronizing clock signal, such as a GPS clock, simplifies the computations, an alternate approach uses the "pre-fault condition" to determine the existence of a fault from a significant change in the balance of the power flow on the line before and after the triggering event without the need for a synchronizing time signal. The change in the power flow balanced from the pre-fault condition to the fault condition is then used to identify the faulted phase and determine the directionality of the fault (i.e., the direction from the monitoring location to the fault). Using the power flow balanced before and after the fault improves the accuracy of the fault detection and directionality determination by preventing an unbalanced power flow condition prior to the fault from masking the fault or otherwise making fault detection and directionality determination more difficult.

As a further useful technique, the pre-fault power flow balance can be used to synchronize the single-phase waveforms to a common time scale, typically by assuming that the pre-fault phase currents sum to zero or a local minimum as the mechanism to align the current waveforms on the common time base. Once the phase current wave forms have been aligned on the common time scale using pre-fault unbalance minimization as the alignment basis, the post-fault currents are sequenced to identify the faulted phase and determine the directionality of the fault. For this approach, the timing of the voltage angle measurement with respect to the phase current measurements at the time of the triggering event is sufficiently accurate for the purposes of faulted phase identification and determination of the directionality of the fault. In other words, the pre-fault to post-fault changes in the current phase waveforms combined with the voltage angle reference at the time of the event trigger is sufficient for the purpose of faulted phase identification and directionality even though the voltage angle waveform may not be strictly synchronized with the common time reference used to align the phase currents on the common time scale.

Although the fault detection system may be implemented without a synchronizing clock signal, a synchronizing clock signal simplifies and improved the accuracy of the current sequencing and other computations that follow. The common time reference can come from any sensor or another device (e.g., the local sectionalizing switch, GPS, or the central controller), which is transmitted to the other sensors and used as a time mark to put them all on the same time basis to directly synchronize the phase current and voltage angle waveforms. This makes post-fault processing of the synchronized data from the event data logs possible with a low processing power microchip or other onboard computer to determine the faulted phase and directionality of the fault. As this approach utilizes event detection with computational fault verification as opposed to a direct protection approach, the time delay required to perform the processing does not interfere with any of the other direct fault protection and clearing functions installed on the power line. However, a significant benefit may be realized by using the present invention to verify and determine the location of faults when restoring the circuit to avoid reclosing into faults, which can further damage equipment that may already have been damaged by the fault and potentially take the equipment out of service entirely and thereby extend the outage for the affected customers.

To increase the cost efficiency of this solution, the event data reporting devices providing the asynchronous phase current and voltage angle measurements can be triggered only upon a detected loss or sufficient change of any phase current to transmit their event data on an as-needed basis.

The triggered event data is then computationally combined and sequenced to create necessary information (typically the magnitude and phase angle of the neutral current or zero-sequence current) to effectively turn the loss or sufficient change in phase current data into useful information that indicates the presence and direction of a high-impedance fault.

Importantly, this approach can also be used to determine which phase is faulted by computationally determining the magnitudes and relative phase angles of the sequence currents by using a GPS time signal or other available reference clock or event trigger as a timing reference. This allows the use of relatively inexpensive current detectors, each independently and asynchronously measuring currents, to provide the data used to perform more complicated functions previously reserved for complete, synchronized three-phase voltage and phase current magnitude and phase angle measurements sent to conventional relays or controllers. The techniques of the present invention can also be used to turn the monitoring equipment on and off, as desired, based on the detection of a loss or sufficient change of a phase current.

With conventional technology, a persistent problem exists when a re-closer or substation detects the presence of a high-impedance fault through simultaneous measurement of phase currents, voltages and phase angles, yet still does not have the ability to determine or localize the location of the fault as there are many line taps on the distribution circuit and the location of the faulty one is not detectable with sufficient resolution to isolate the faulted line or equipment to allow restoring the service. Embodiments of the present invention, on the other hand, may operate adequately with any available reference time signal for many distribution systems. With the addition of either a single voltage phase angle measurement synchronized with the current measurements, or a time synchronized voltage phase angle data from a remote reference voltage, the system can be used to determine the direction to the fault at each sensor group node (i.e., each current monitoring station).

It should be noted that the voltage angle measurement is only needed to determine fault direction and not the presence of the fault and identification of the faulted phase, which the present invention can reliably determine with only the asynchronous phase current measurements. The determination of the direction from a monitoring station to the high-impedance fault using the classical techniques requires a high precision synchronized voltage measurement on all three phases. In some cases, line mounted current monitoring devices using capacitive coupling through air to determine voltage magnitude and phase angle may not provide sufficiently high precision because environmental effects of moisture and industrial pollution cause significant magnitude and phase angle errors. In embodiments of the present invention, a voltage measurement device determining only the voltage phase angle of voltage with sufficient precision, without regard to magnitude accuracy, is sufficient to determine the direction from the current monitoring location to the high-impedance fault once the faulted phase has been identified. When this approach is used, no other (conventionally high cost) synchronizing method is needed to obtain sufficient precision to determine the direction to the high-impedance fault from the monitoring location.

The consolidation point of the asynchronous current monitoring data (plus voltage phase angle data if improved reliability in the determination of the direction to the high-impedance fault from the current monitoring location is desired) can either be implemented in a base unit near the current monitoring location, or it can be integrated into one or more of these line mounted current monitoring devices. As another option, the measured data may be transmitted to a local or remote control location, for example with SCADA or other communication equipment. In particular, a centralized control location may be utilized to monitor all (or a subset) of the current (and voltage if desired) monitoring locations and determine the presence of high-impedance faults, identify the faulted phase, and determine the direction from multiple (at least two) monitoring locations to the fault to localize the fault (i.e., determine the location of the high-impedance fault with the precision of being located between two adjacent monitoring locations).

The present invention is compatible with conventional line mounted phase current sensors. Currently available examples include Horstmann Fault Indicators (for medium voltage networks), Fisher Pierce 1548FH-ANC3-R-B-A Overhead Fault Circuit Indicator; Fujian CEE Installation Co., Ltd. Overhead Fault Circuit Indicator, GridSense Line Fault Detection Sensor, and SEL fault circuit indicators. Event data (e.g., asynchronous, independent phase current measurements) can be triggered, captured and uploaded by conventional RF devices to another location. Voltage data can similarly be triggered, captured and uploaded by conventional RF devices to another location. The controller (local or remote) of the invention receives the current measurements from suitable line mounted sensors, receives a GPS or other timing signal for use as a reference time signal, may also obtain voltage phase angle data (typically from a measuring device the nearest monitored substation to the current monitoring location) as desired, and performs the following, which are typically performed at multiple monitoring locations to determine the location of the high-impedance fault with the precision of being located between two adjacent monitoring locations:

1) Trigger collection of and transmission data on a current "turn off" or change event so that high-impedance faults can be detected that are not otherwise detected by single phase overcurrent devices.
2) Combine asynchronous single-phase current information from multiple phases to create a complete set of data for doing fault detection and direction determinations.
3) Synchronize event data using GPS or other reference time signals to obtain a common time based synchronization of these independently collected sets of data.
4) Use voltage angle reference data co-collected with the phase current data to create a three phase data set.
5) Sequence the currents to determine the magnitudes and phase angles of the sequence currents to detect the presence of the fault, identify the faulted phase, and determine the direction of the faulted phase from the monitoring location.

Turning now to the figures, FIG. 1 is a one line diagram of a high-impedance fault detection and isolation system 10 using distributed line-mounted phase current sensors 20a-c. The illustrative portion of the distribution network includes three line segments 12, 14 and 16 (each representing a three-phase power line segment) in a "T" configuration and three sectionalizing switches 18a-c under the control of a central controller 22. When a fault occurs on the distribution network, for example when a tree limb contacts or to comes too close to with one of the phase conductors, the central controller 22 operates one or more of the switches to isolate (disconnect) the faulted line segment while keeping the non-faulted segments in service.

To implement fault isolation, the central controller 22 needs to receive or determine an indication that a fault has occurred, the phase on which the fault has occurred, and the direction of the fault from a number of monitoring locations. The line current sensors 20a-c along with the voltage angle sensor 21 provides the controller 22 with the required information. While low-impedance faults producing high fault currents are easily detected and in most cases automatically isolated through breaker operation, high-impedance faults producing low currents (which is possible, for example, with arcing faults to tree limbs or other obstructions coming near power lines) are more difficult to detect. The system 10 shown in FIG. 1 for an illustrative portion of an electric power distribution network may be repeated at multiple locations throughout the network to implement a network-wide high-impedance fault detection and isolation system.

Because the system 10 is designed to detect and isolate high-impedance faults, it cannot rely on high fault currents. The system therefore utilizes three phase current measurements, (optionally) a voltage angle measurement, and (optionally) a synchronizing clock signal to place the current and voltage measurements on a common time scale. The controller analyzes this data to sequence the currents (i.e., compute the positive sequence, negative sequence, and zero sequence currents) at each monitoring location 20a-c. From the sequence currents, the controller identifies the faulted phase and the direction of the fault from each monitoring location to the fault, which allows the controller to identify the particular line segment where the fault is located.

It should be appreciated that any of the components may be configured with all or a portion of the system intelligence, including the intelligence to detect triggering events, maintenance of the synchronizing clock or the intelligence to place the current and voltage waveforms on a common time scale using historical data in lieu of a synchronizing clock, the intelligence to perform the current sequencing computations to identify the faulted phase and directionality of the fault, and the intelligence to determine the appropriate sectionalizing switch operations and direct switch operation. Different configurations will be advantageous depending on which components are obtained from third parties and which components are amenable to customization. In order to implement a coordinated system analysis and switching program, the intelligence to determine the appropriate sectionalizing switch operations and direct switch operation will usually be performed by a central control station with the individual switching stations communicating with the central control station via SCADA or a similar distributed control architecture.

Figure 2:
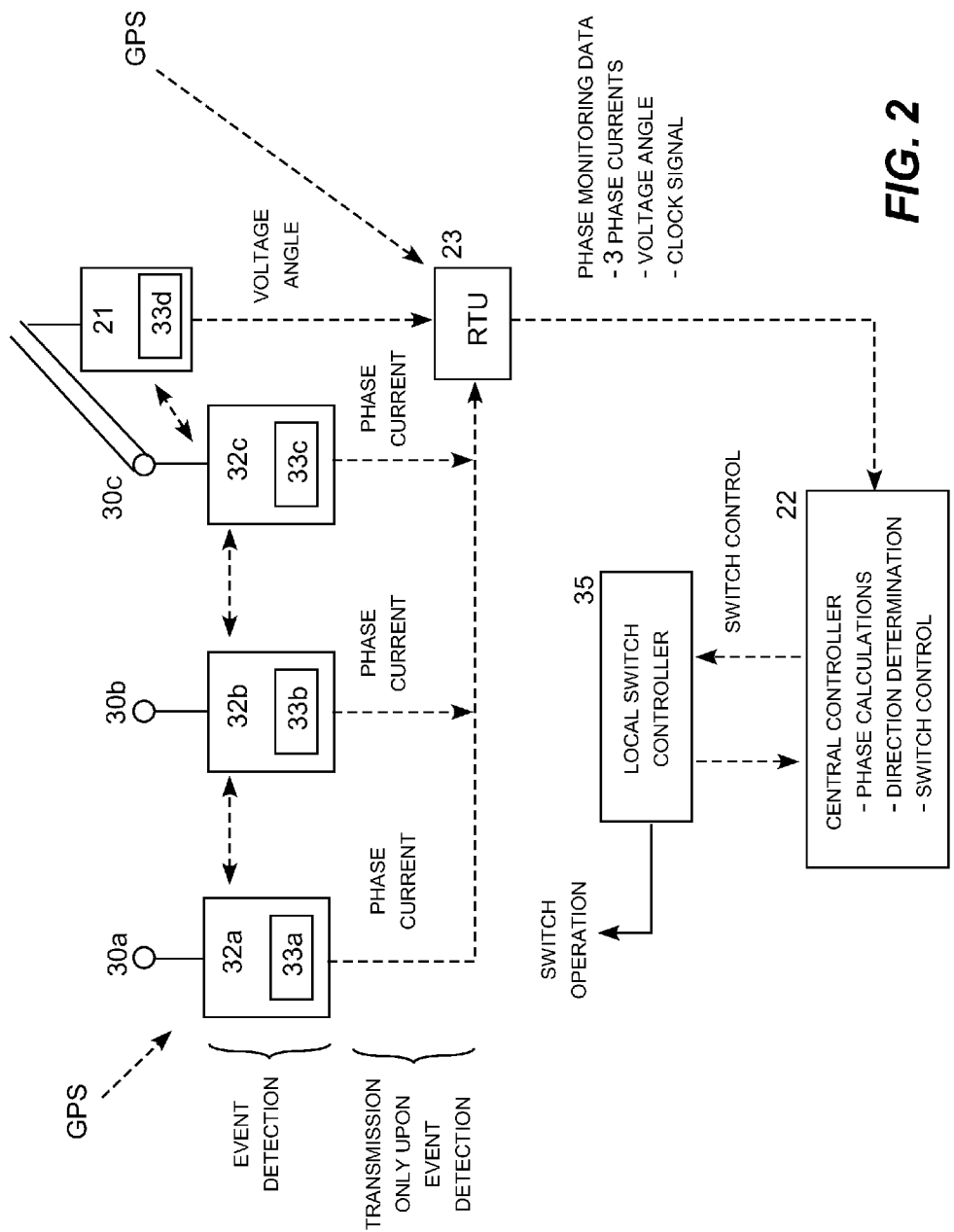
FIG. 2 is a block diagram of a three phase high-impedance fault detection and direction detector.

FIG. 2 illustrates one possible configuration for the monitoring unit. Each phase conductor 30a-c has an associated asynchronous, line-mounted current sensor 32a-c. A local controller 35 operates the sectionalizing switches 18a-c (shown in FIG. 1) typically in response to coordinated operation commands received from a central controller 22. Each current sensor has a rolling data log 33a-c, which contains a sufficient amount of monitoring data for event analysis, such as several minutes of data samples collected every few milliseconds. The data log constantly rolls over, maintaining a recent history phase current waveform file. The contents the data log is copied to a persistent local memory on the current sensor and uploaded to an analysis location in response to an event trigger. Each current sensor 32a-c is also configured to detect potential fault events and send "wake-up calls" to the other sensors upon detecting a potential fault event.

In this particular configuration, the line sensors 33a-c transmit their event log data to a remote transmitter unit (RTU) 23, which packages and relays the event data received from the current sensors 32a-c correlated with a local or GPS reference clock signal to the central controller 22. The RTU then sends an event data file including the three current wave forms containing historical data just prior to and following the detected event correlated with the reference clock signal and the event time marks for each current waveform to the central controller 22. The local or GPS reference clock signal may be maintained locally or acquired from GPS and may be maintained or acquired by the RTU, each current sensor individually, or by any selected sensor so long a common event time mark is ascribed to current waveform to place them on a common time scale when an event is detected. An event data package containing the three phase current waveform event histories and a common time scale or event time mark is sufficient for the central controller to sequence the phase currents to verify the presence of a high-impedance fault and identify the faulted phase. As an option, a voltage angle sensor 21 with its own data log 33d may also be included to allow the direction of the fault from the monitoring location to be determined.

As another option to simplify the computations, each of the sensors 33a-c and 21 may receive a common GPS clock signal used as a common time base and stored with the waveform data stored in the data logs. Alternatively, any one of the sensors, or another device such as the local controller 35, may operate a local clock that is used to generate a common time base upon event triggering. In this particular example, the RTU 23 may contain the local or GPS clock to provide the common time base.

Locating the current sequencing intelligence in the central controller 22 avoids duplication of the intelligence, allowing the RTU 23 to operate primarily as a data waypoint and local clock reference. In this role, RTU 23 accumulates the event data from the sensors 32a-c and 21, typically wirelessly, upon event detection and assembles an event file containing the three phase current waveforms, the voltage waveforms, and the reference clock signal for each event. The event data file is then transmitted to the central controller 22, which perform the phase sequence calculations (for this and any number of other monitoring stations that detected the triggering event), determines the faulted phase and directionality from this monitoring location (and from the other monitoring stations that detected the triggering event), and implements a coordinated sectionalizing scheme based on the event data from the various monitoring locations. The central controller 22 then returns switch control commands to the local controller 35 (when switch operation at this particular location is determined to be the appropriate response), and the local controller operates the switches 18a-c as indicated. This configuration saves power and minimizes data overhead by allowing all of the components to remain in a "silent mode" during normal operation, asynchronously recording event data and monitoring their respective parameters, until an event is detected by one of the sensors. Event detection triggers the wake-up call to the other sensors, event storage and uploading, and the resulting response operations.

The configuration shown in FIG. 2 is advantageous when off-the-shelf current sensors configured to perform event detection are to be used and the local switch controller is not amenable to modification. In addition, for a configuration in which off-the-shelf current sensors cannot be configured to perform event detection, the RTU 23 may be configured to perform the event detection functionality using the monitoring data provided by the current sensors 32a-c (and the voltage angle sensor 21 if desired). In this case, the sensors 32*a-c* (and optionally 21) communicate data continuously to allow the RTU to perform event detection continuously. This is not a problem for the current sensors, which can be inductively powered by the power line. The RTU may also be located near the power line and powered inductively by the power line, or it may be located near the ground and have an alternative power supply, such as a solar charged battery unit.

Figure 3:
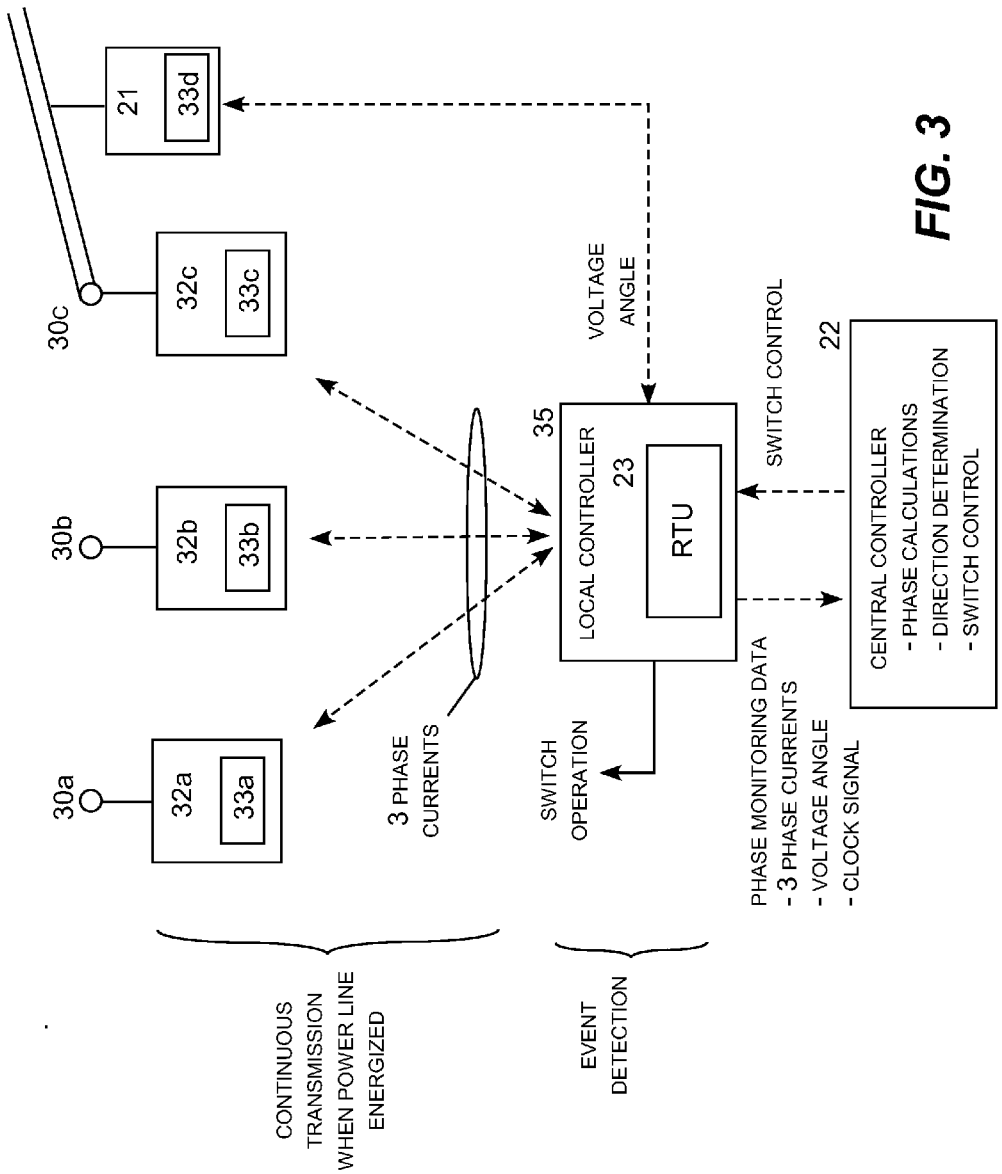
FIG. 3 is a block diagram of a first alternative configuration for the three phase high-impedance fault detection and direction detector.

FIG. 3 illustrates an alternative embodiment in which the RTU 23 shown in FIG. 2 has been incorporated into the local switch controller 35, which is an advantageous configuration when the switch controller is available for modification. When this option is available, locating the RTU in the local switch controller takes advantage of the preexisting cabinet, walk up access, electric service and the existing communication capability with the central controller already in place at the local controller. In addition, this configuration may be well suited to a system using off-the-shelf current sensors that are not configured to perform event detection by locating the event detection logic in the RTU within the local controller. For this configuration, the current and voltage angle sensors communicate data continuously, but this is not problematic because they remain inductively energized and operational whenever the power line is energized. In addition, the RTU remains energized and operational whenever the local controller is operational, which avoids the need for an auxiliary power supply.

Figure 4:
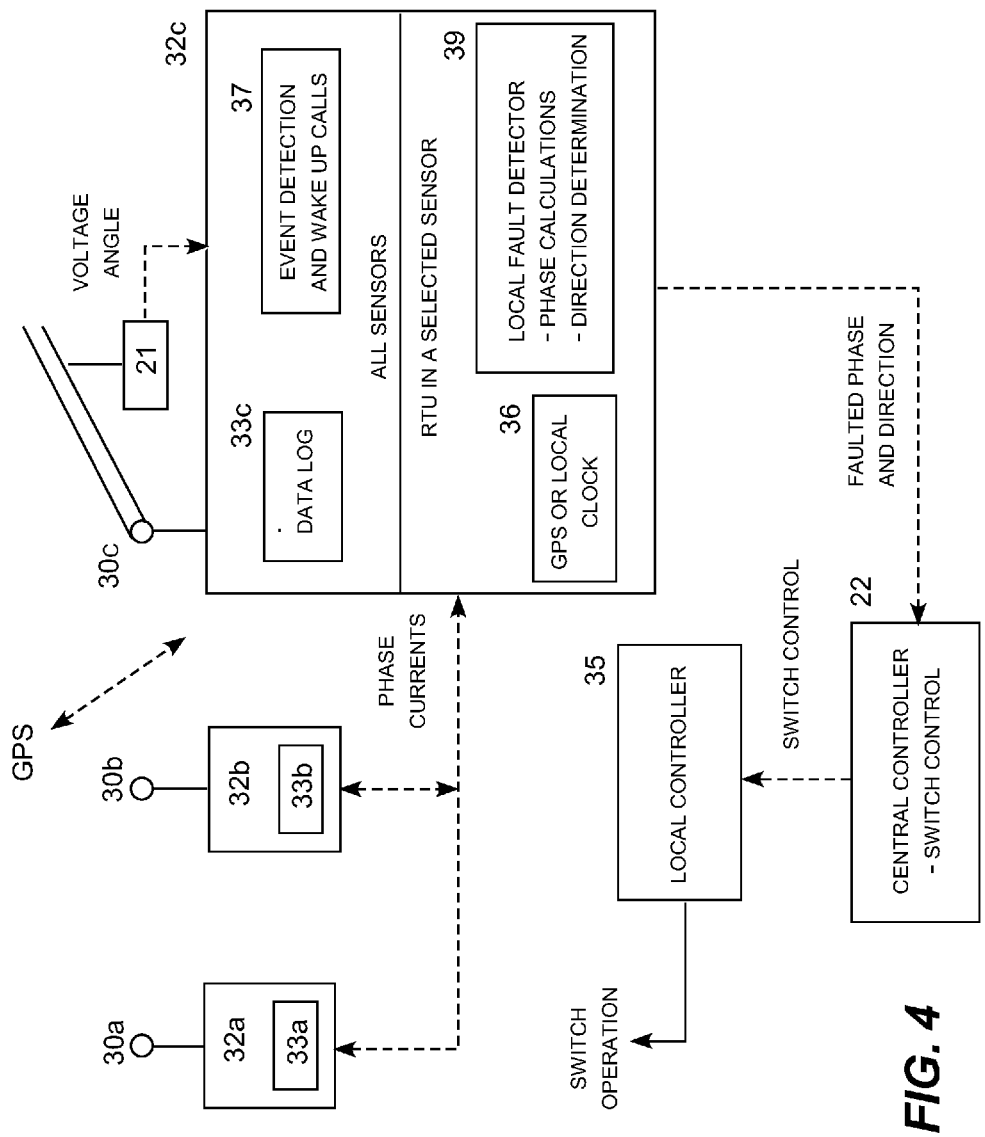
FIG. 4 is a block diagram of a second alternative configuration for the three phase high-impedance fault detection and direction detector.

FIG. 4 illustrates another alternative in which the RTU is incorporated into a selected sensor. If the current sensor unit is available for modification, much of the intelligence may be located in the sensor itself. This configuration provides the advantage of having the local power supply for the RTU functionality available through inductive coupling to the power line. This configuration also allows event detection at the sensor, which avoids the need for any communication to take place unless and until an event is detected. Once an event is detected, the detecting sensor sends a "wake-up call" to the other sensors causing them to locally store and upload their data logs. Any of the sensors or another local device can maintain a GPS or local clock to provide a common time base.

In this alternative, each current sensors 32*a-c* is configured to detect triggering events on its associated phase conductors and send wake-up calls to the other sensors upon event detection. This avoids the need for the current sensors 32*a-c* or the voltage sensor 21 to communicate with other devices until they detect a triggering event or receive a wake-up call from an event detecting sensor. In addition, for this option the sensors 32*a-c* and 21 may include GPS chips allowing them to record the synchronizing clock signal into their data logs. In addition to the rolling buffers 33*a-d*, each sensor 32*a-c* and 21 may also include a supply of persistent memory sufficient to store a number of event data records. Since the waveform data files each include a common GPS time base, the sensor with the RTU capability can be configured to perform the current sequencing, faulted phase identification, and fault directionality analysis with an inexpensive microprocessor. In this case, for each detected event the sensor configured with the intelligence and RTU capability sends an event file to the central controller 22 only when a high-impedance fault has been confirmed, and only need to indicate the time of the event, the faulted phase, and the direction from the monitoring station to the fault. The central controller 22 can then use this information from the various monitoring stations that detected the fault to operate the sectionalizing switches to isolate the fault.

Figure 5:
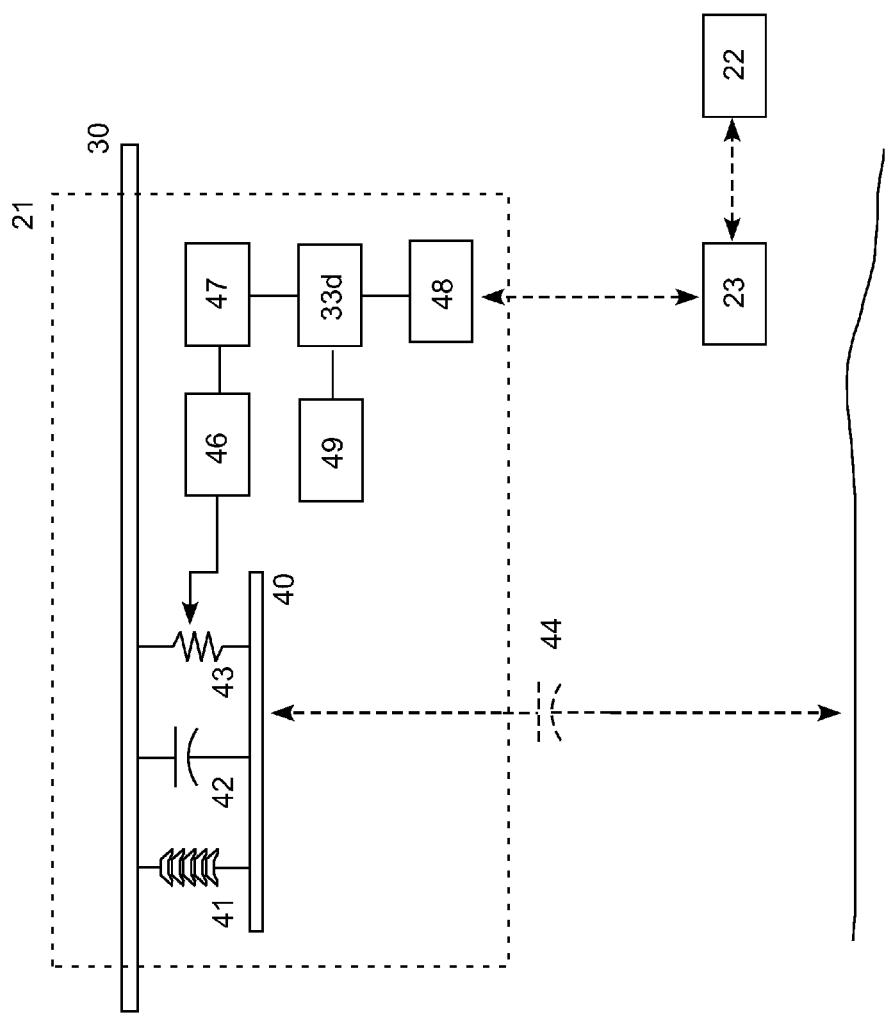
FIG. 5 is a block diagram of a voltage angle detector for three phase high-impedance fault detection and direction detector.

FIG. 5 is a block diagram of a low cost, line-mounted voltage angle sensor 21 suitable for use in the high-impedance fault detector connected to and supported from a phase conductor 30. The voltage angle sensor includes a conductive plate 40 spaced apart from the conductor 30 by an insulator 41. A capacitor 42 and a medium-ohm resistor voltage divider 43 are connected across the air gap between the conductor and the metal plate. There is a natural capacitance of about one pF in the air gap between the conductive plate 40 and the ground. A suitable capacitor 42 of about 500 pF and a resistor 43 of about 1,000 Ohms create a voltage divider between the capacitor 42 and the natural capacitance 44 dominated by the capacitor 42 and the resistor 43. The dominance of the resistor 43 prevents environmental factors, such as moist debris (crud) between the conductor 30 and the plate 40, from causing the voltage angle across the resistor 43 from varying greatly. That is because any conductive path between the conductor and the plate created by environmental crud will have a resistance far higher than the 1,000 Ohm value of the resistor 43 allowing the resistance of the path between the conductor and the plate to be dominated by the resistor.

Similarly, the dominance of the capacitor 42 prevents environmental changes, such as changes in humidity and the magnitude of the power flow in the line, from causing the voltage angle across the resistor 43 from varying greatly. That is because any change in the natural capacitance of the line 44 will be far smaller than the 500 pF value of the capacitor 42. It should also be noted that the plate 40 is strongly coupled to the power line 30 but only very weakly coupled to ground so that current flows in the voltage angle detectors are minimal, while the capacitor divider is dominated by the capacitor 42 and the resistor 43, which provides a stable voltage angle measurement at the resistor divider.

The resistor divider provides an analog voltage waveform (that is significantly impervious to changing environmental conditions) to an A/D converter 46, which provides a digitized waveform to the data log 33*d*. A radio or other suitable transmitter 48 provides the contents of the 33*d* to the RTU 23 for packaging with the other event data for transmission to the central controller 22 for event analysis. The sensor may also include a persistent memory 49 for locally storing a number of event data logs locally. The A/D converter 46 may also function as a power supply providing electric power inductively coupled from the power line to operate the other electronic components of the sensor.

Figure 6:
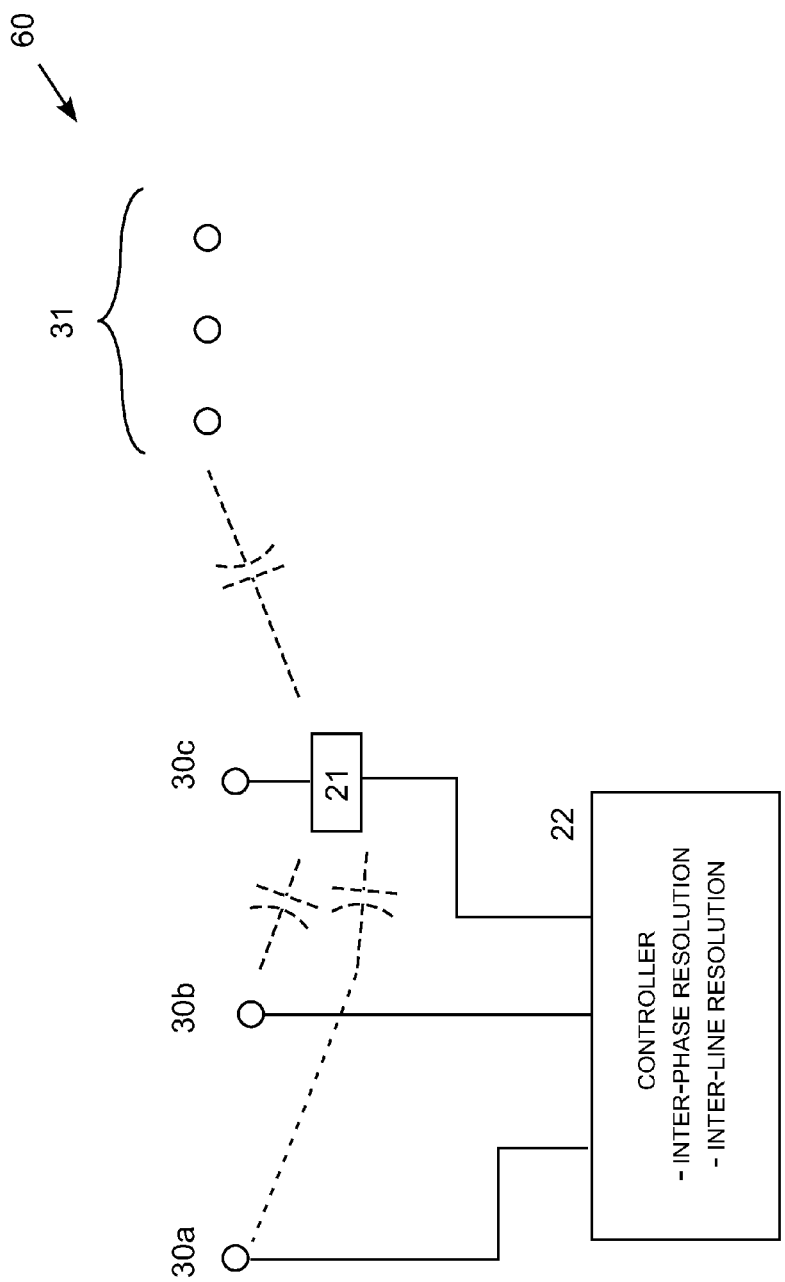
FIG. 6 is a block diagram of a voltage angle detector with inter-phase and inter-line resolution functionality.

FIG. 6 is a block diagram of a voltage angle detector system 60 with inter-phase and inter-line resolution functionality. Capacitive coupling between the other phases of the power line as well as nearby power lines can adversely affect the accuracy of the voltage angle measurement taken near a subject phase conductor. The accuracy of the voltage angle detector 21 described with reference to FIG. 5 can therefore be improved by taking into account inter-phase interference from the nearby phase conductors of the same power line and nearby power lines. In the example shown in FIG. 6, the accuracy of the voltage angle measurement at the phase conductor 30*c* is improved by taking into account inter-phase interference from the nearby phase conductors 30*a* and 30*b* of the same power line (referred to as inter-phase resolution) as well as inter-line interference from the nearby power line 31 (referred to as inter-line resolution).

The capacitive coupling effect of the nearby phases and power lines can be estimated through direct computation when actual measurements are available for the currents and physical parameters, which may be the case in a substation. In this situation, a computer model of the physical power line configuration receives the available current and voltage measurements, estimates the capacitive coupling using theoretical computations, and computes the voltage angle taking the inter-phase and inter-line resolution into account. In the more general situation, the voltage angle measurement is being determined out on a power line away from the substation where complete measurement data is not available. In the most general case, only a single voltage angle measurement is available using an open-air sensor such as the sensor 21 shown in FIG. 5. There are several ways to estimate the capacitive coupling from nearby phases and power lines for inter-phase and inter-line resolution. In many cases, the inter-phase capacitive coupling can be estimated and resolved directly from the power line physical configuration and current measurements from local phase current monitors. Alternative methods may be utilized to resolve interference arising from other phase conductors and power lines.

In a first approach, a computer model of the physical power line (or multiple power line) configuration is created and used to model the inter-phase and inter-line interference based on the physical parameters and theoretical computations. The physical power line configuration model is augmented with available power level data, such as load levels on the nearby phases and power lines measured at substations, to estimate inter-phase and inter-line interference based on some level of measurement data and the physical configuration model. In a hybrid approach, the computer model may be calibrated with temporary monitoring equipment.

In a second alternative approach, the inter-phase and inter-line interference is measured using temporary monitoring equipment during a calibration period. The interference profile at different load levels may be determined using the temporary monitoring equipment over a relatively short calibration period, such as a typical day or a week. Calibration data may also be collected during periods of specific interest, such as seasonal peak-load periods, high-power interchange periods, operation of specific power plants, operation of specific industrial loads (e.g., mining, pumping, manufacturing, smelting, electric trains) and so forth. The calibration data is then used to estimate inter-phase and inter-line resolution going forward.

In a third approach, a neural network (or other type of auto-regressive computer model) may be constructed to learn weighting parameters based on historical measurements data available. The neural network may also take into account environmental factors, such as local temperature, humidity, rain, fog, icing and so forth when learning inter-phase and inter-line capacitive coupling effects. Once trained with historical data, the auto-regressive model is used to compute inter-phase and inter-line capacitive coupling effects and continually update the learned parameters to continually refine the model parameters.

Figure 7:
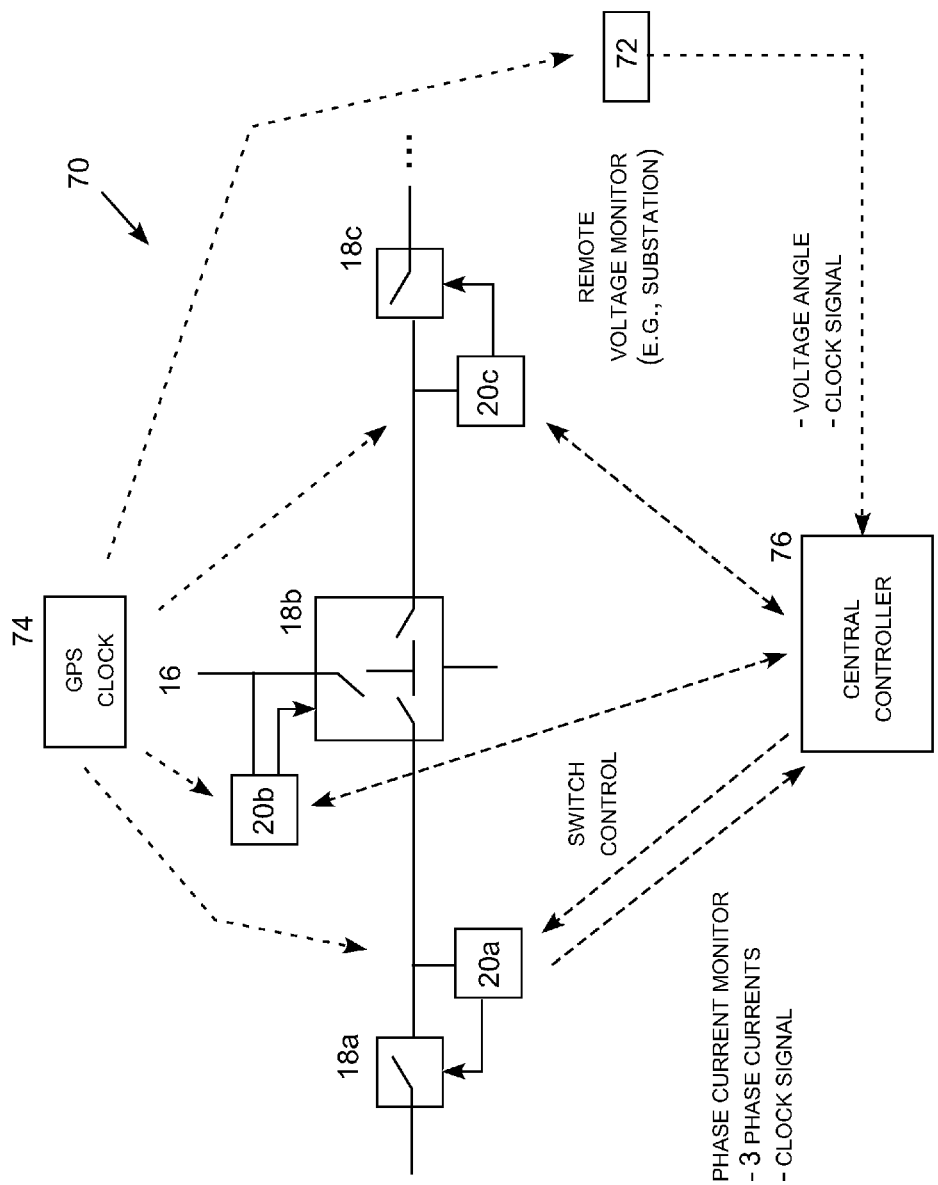
FIG. 7 is a block diagram of a three phase fault detection and direction detector utilizing a remote voltage monitor, a common reference clock, and a central controller.

FIG. 7 is a block diagram of a three phase fault isolation system 70 utilizing a remote voltage monitor 72, a common reference clock 74, and a central controller 76. While the previous discussion addresses a variety of techniques for improving the accuracy of a voltage angle measurement taken with an inexpensive open-air sensor located in an electrically noisy environment, FIG. 7 illustrates an additional or alternative approach utilizing a remote voltage monitor, which may be a traditional (and more expensive) voltage monitor 72 that is already installed at many substations. That is, the existing substation voltage monitor 72 and a common reference clock 74 is utilized to provide the reference voltage for a number of current monitoring stations located away from the substation. Since the voltage angle measurement does not vary significantly along a power line (or throughout a synchronously operated power grid), the use of the common reference clock 74, such as the GPS clock, allows the remote voltage monitor 72 to be synchronized with one or more current measurements in one or more locations located away from the substation, typically along a power line extending from the substation (or other locations within the same power grid). For example, a voltage measurement obtained for a power line at a substation may be synchronized with multiple current phase measurements taken at a number of power monitoring locations along that particular power line utilizing a common reference clock signal. This allows the same voltage measurement to be synchronized with current measurements taken at multiple tap points along the power allowing a faulted line segment to be identified and isolated.

FIG. 7 illustrates a one-line diagram for a particular example configuration for a three phase fault isolation system 70 for an illustrative tap-point on a power line. The fault isolation system 70 includes sectionalizing switches 18a-c, three-phase current monitors 20a-c, a remote voltage monitor 72, a common reference clock 74, and a central controller 76. To implement fault isolation, the central controller 76 needs to receive or determine an indication that a fault has occurred, the phase on which the fault has occurred, and the direction of the fault from a number of monitoring locations. The line current sensors 20a-c along with the voltage angle sensor 72 provides the controller 76 with the required information. The common reference clock 74 allows the current measurements obtained by the current sensors 20a-c to be synchronized with the reference voltage measurement obtained by the remote voltage monitor 72. The current and voltage measurements are each stored in data logs correlated with the common clock signal, which allows the central controller 76 to place all of the measurements on a common time scale when making the fault isolation computations.

That is, the system 70 operates equivalently to the system 10 described with reference to FIG. 1 with the exception that the local reference voltage monitor 21 has been replaced by the remote voltage monitor 72 and the common reference clock 74. In this particular configuration, three-phase current signals and the reference clock signal are transmitted from the current monitors 20a-c to the central controller 76. The remote voltage monitor 72, typically located at a substation serving the power line monitored by the current sensors 20a-c, correlated with the same reference clock signal are also transmitted to the central controller 76. The central controller uses this information to detect the presence of a fault, identify the faulted phase, determine the directionality of fault from each of the current monitors 20a-c, and send switch control signals to operate one or more of the switches 18a-c to isolate the fault.

Figure 8:
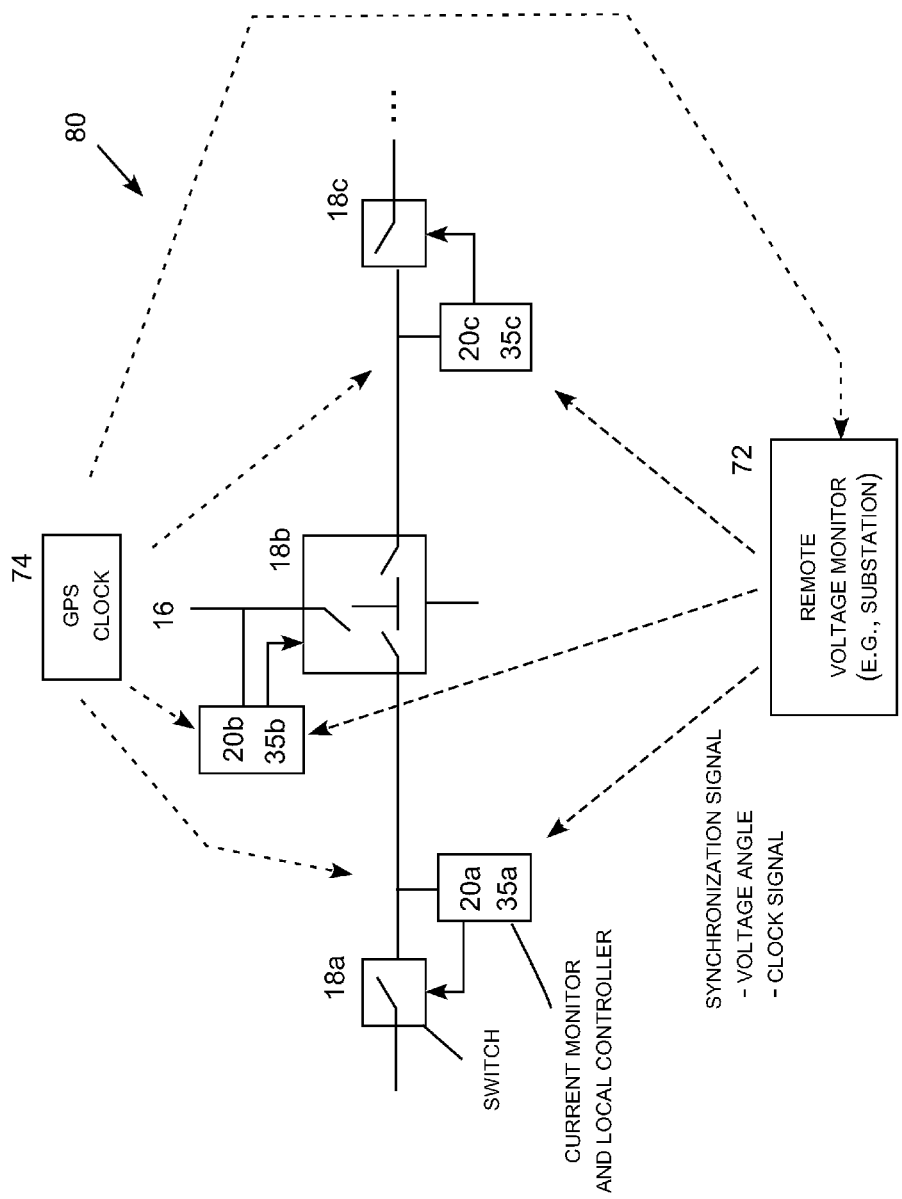
FIG. 8 is a block diagram of a three phase high-impedance fault detection and direction detector utilizing a remote voltage monitor, a common reference clock, and distributed controllers.

FIG. 8 illustrates a one-line diagram for an alternative configuration for a three phase fault isolation system 80 for a tap-point on a power line. This configuration is analogous to the shown in FIG. 4 in that the controller functionality is located in one or more local controllers 35a-c at one or more of the line switch locations. In this configuration, remote voltage sensor 72 sends the reference voltage signal correlated with the clock reference signal to one or more of the local controllers 35a-c, which detects the phase of a fault, determines the directionality of fault from each of the current monitors 20a-c, and operates one or more of the switches 18a-c to isolate the fault. The fault isolation functionality may be located in each local controller 35a-c as shown in FIG. 8. Alternatively, the fault isolation functionality may be located in a selected one of the local controller, which communicates control signals to the other local controllers.

Figure 9:
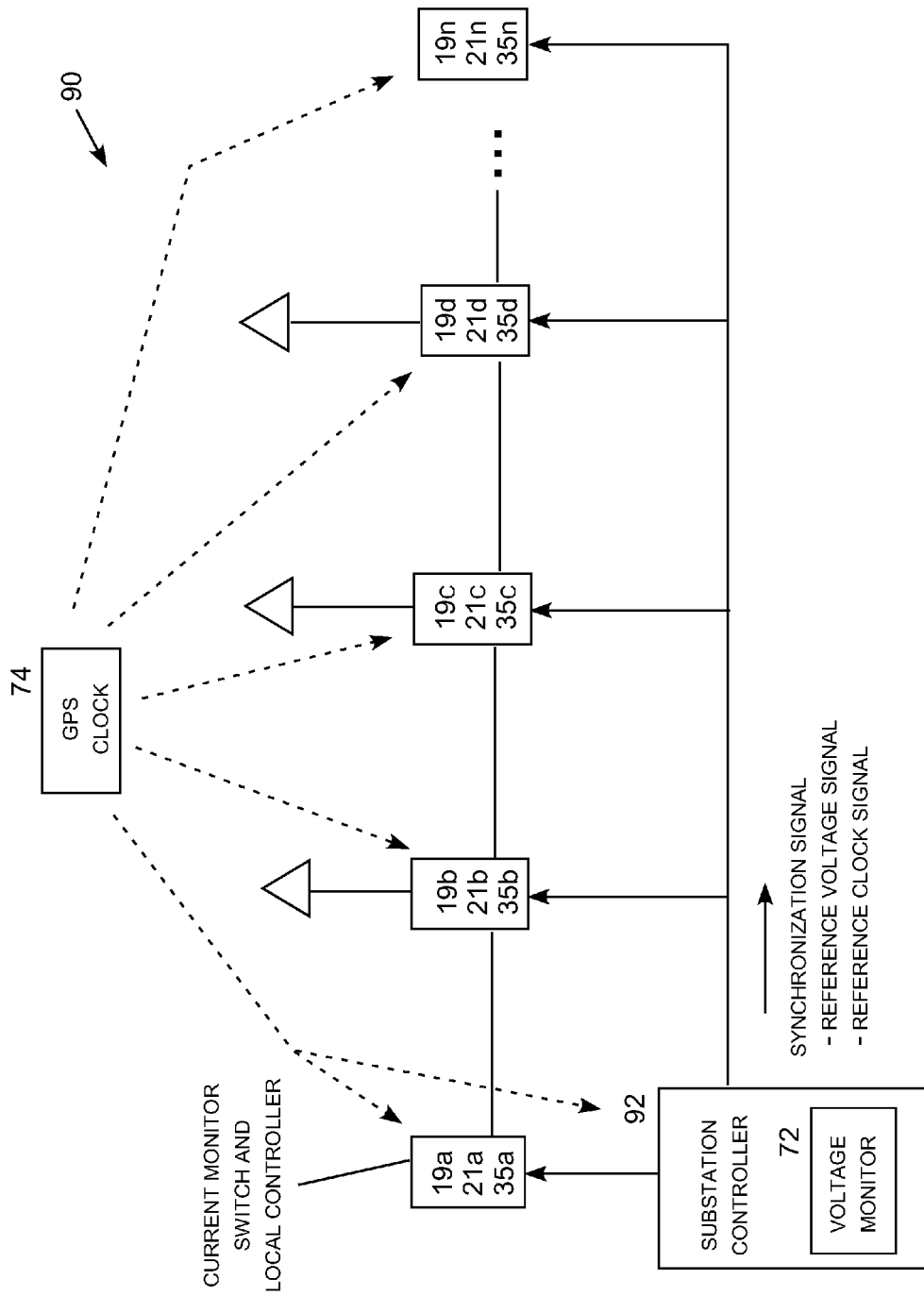
FIG. 9 is a block diagram of a fault detection and isolation system for a power line with multiple tap points utilizing a remote voltage monitor, a common reference clock, and distributed controllers.

FIG. 9 illustrates a one-line diagram for an alternative configuration for a three phase fault isolation system 90, which generalizes the approach to a power line with multiple tap points. In this example, the voltage monitor 72 is located in a substation controller 92 serving the power line and each tap point on the line includes a sectionalizing switch, a current monitor, and a local controller. For example, a first tap point includes a sectionalizing switch 19a, a current monitor 21a, and a local controller 35a. It will be appreciated that the sectionalizing switch 19a may actually include three sets of sectionalizing switches corresponding to the switches 18a-c shown in FIG. 8. Each of the switches actually represents three phase switches, one for each phase conductor of the power line. Similarly, each current monitor 21a represents three sets of current monitors corresponding to the current monitors 20a-c shown in FIG. 8. Moreover, each of the current monitor represents three phase switches, one for each phase conductor of the power line. The local controller 35a may be consolidated for the tap point or distributed among multiple devices at the tap point. The substation controller 92 sends the reference voltage signal and the reference clock signal to the local controller 35a, which detects the phase of a fault, determines the directionality of fault from the current monitors 35a, and operates the sectionalizing switch 19a as needed to isolate the fault.

In the configuration 90, the substation controller 92 includes the voltage monitor 72 and receives the reference clock signal from the GPS clock 74, which is also received by the phase current monitors 21a-n. The voltage waveform is correlated to the reference clock signal and stored in a data log at the substation controller 92. Similarly, the phase current waveforms are correlated to the reference clock signal and stored in data logs at the phase current monitors 21a-n. Upon fault event detection, the detecting device sends a "wake-up" call to the other data logging devices, which causes the substation controller 92 to transmit a synchronization signal including the voltage waveform data file correlated to the reference clock to the tap-point controllers 35a-n. The tap-point controllers 35a-n, in turn, validate occurrence of a fault. If a fault is confirmed, tap-point controllers 35a-n determine the faulted phase and the location of the fault (faulted line segment) through peer-to-peer communication and operate the appropriate sectionalizing switches to isolate the faulted phase line segment.

In the configuration 90, the sectionalizing procedure described above is performed at each tap point (or other current monitoring location) along the power line utilizing data logs and event triggers as described with reference to FIG. 4 in the fault detection and isolation process. The multiple tap points are operated in a coordinated manner to detect and isolate the fault as described in U.S. Pat. No. 8,659,862. The system 90 shown in FIG. 9 improves over the system described in U.S. Pat. No. 8,659,862 through the use of a single reference voltage and a common clock reference for multiple current monitoring stations along the power line as well as the use of data logs and event triggers in the fault detection and isolation process. The system 90 shown in FIG. 9 therefore combines the basic fault detection and isolation system of U.S. Pat. No. 8,659,862 with the clock reference signal, data logging an event trigger system of U.S. patent application Ser. No. 13/864,611 (Pub. No. 2013-0229735), and extends the system further by utilizing a single reference voltage measurement located anywhere in the system, multiple three-phase current monitors producing asynchronous event data, and a common reference clock to implement a multi-point fault detection and isolation system utilizing a common reference clock.

Figure 10:
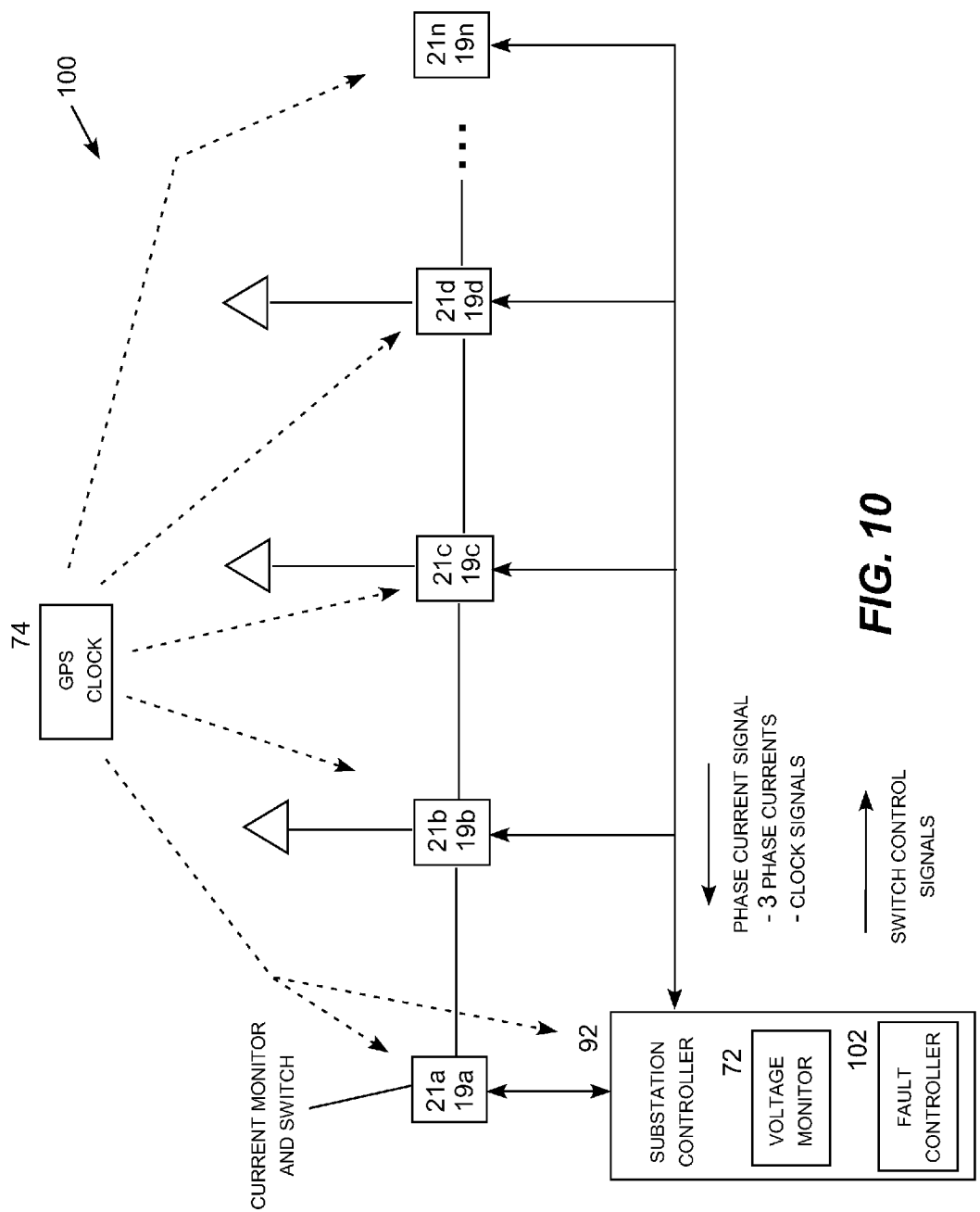
FIG. 10 is a block diagram of a fault detection and isolation system for a power line with multiple tap points utilizing a remote voltage monitor, a common reference clock, and a controller located in a selected substations.

It will be further appreciated that the fault detection and isolation functionality may be distributed or centralized and located in any desired device within the system. As another example, FIG. 10 illustrates an alternative system 100 in which the local controllers 35a-c are replaced with a central fault controller 102 located at the substation 92 where the voltage monitor 72 is also located. The substation controller 92 receives the reference clock signal from the GPS clock 74, which is also received by the phase current monitors 21a-n. The voltage waveform is correlated to the reference clock signal and stored in a data log at the substation controller 92. Similarly, the phase current waveforms are correlated to the reference clock signal and stored in data logs at the phase current monitors 21a-n. Upon fault event detection, the detecting device sends a "wake-up" call to the other data logging devices, which causes the phase current monitors 21a-n to transmit synchronization signals including the current waveform data files correlated to the reference clock to the central fault controller 102. The central fault controller 102 then validates occurrence of a fault. If a fault is confirmed, the central fault controller 102 determines the faulted phase and the location of the fault (faulted line segment) and transmits sectionalizing switch control signals to operate the appropriate sectionalizing switches to isolate the faulted phase line segment.

Figure 11:
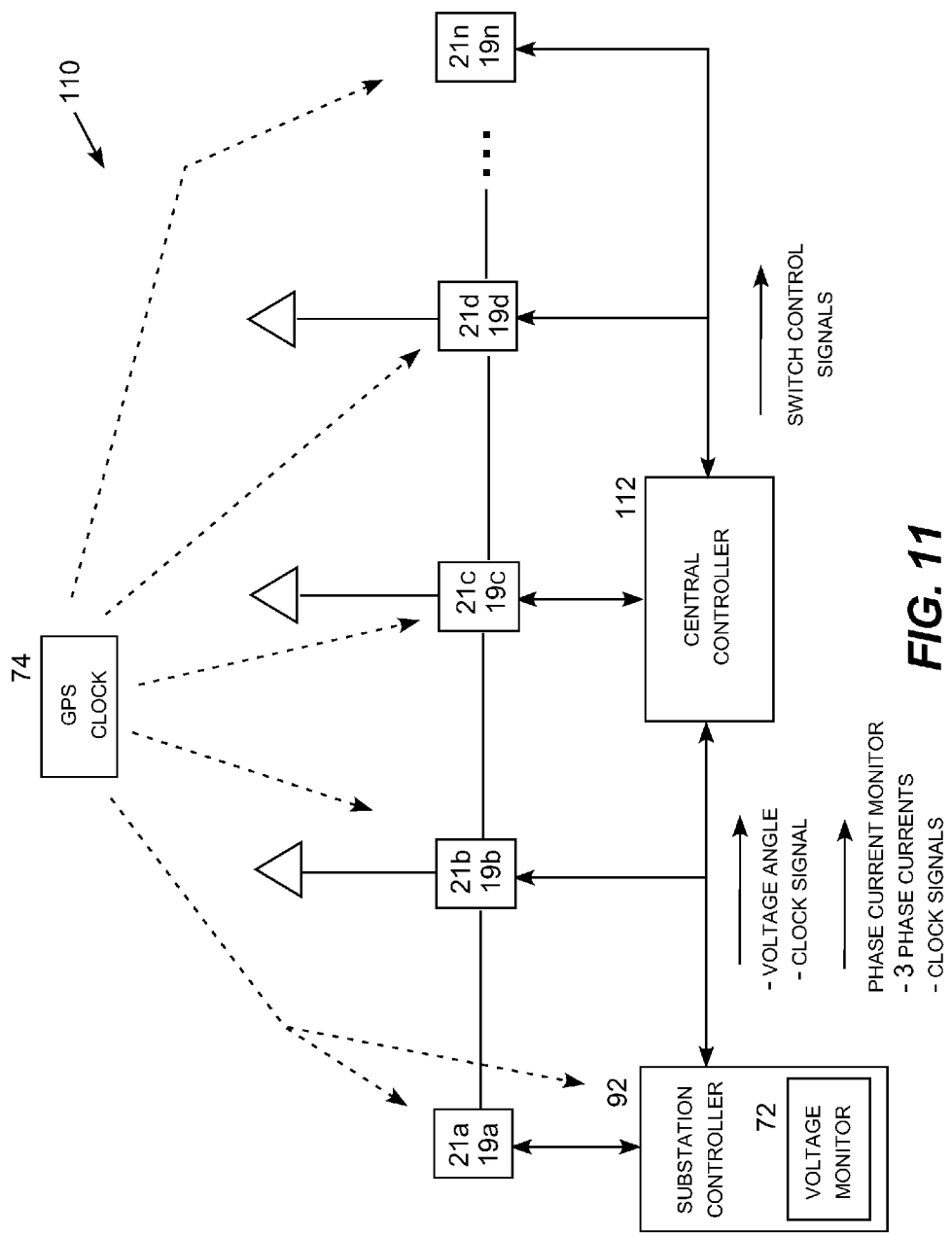
FIG. 11 is a block diagram of a fault detection and isolation system for a power line with multiple tap points utilizing a remote voltage monitor, a common reference clock, and a central controller.

FIG. 11 illustrates another alternative configuration 110 in which the fault detection and isolation functionality is located in a central controller 112 located remotely from the substations, such as centralized control center. The substation controller 92 receives the reference clock signal from the GPS clock 74, which is also received by the phase current monitors 21a-n. The voltage waveform is correlated to the reference clock signal and stored in a data log at the substation controller 92. Similarly, the phase current waveforms are correlated to the reference clock signal and stored in data logs at the phase current monitors 21a-n. Upon fault event detection, the detecting device sends a "wake-up" call to the other data logging devices, which causes the phase current monitors 21a-n to transmit synchronization signals including the current waveform data files correlated to the reference clock to the central fault controller 112. The voltage monitor 72 at the substation 92 likewise transmits a synchronization signals including the voltage waveform data file correlated to the reference clock to the central fault controller 112. The central fault controller 112 then validates occurrence of a fault. If a fault is confirmed, the central fault controller 112 determines the faulted phase and the location of the fault (faulted line segment) and transmits sectionalizing switch control signals to operate the appropriate sectionalizing switches to isolate the faulted phase line segment.

Figure 12:
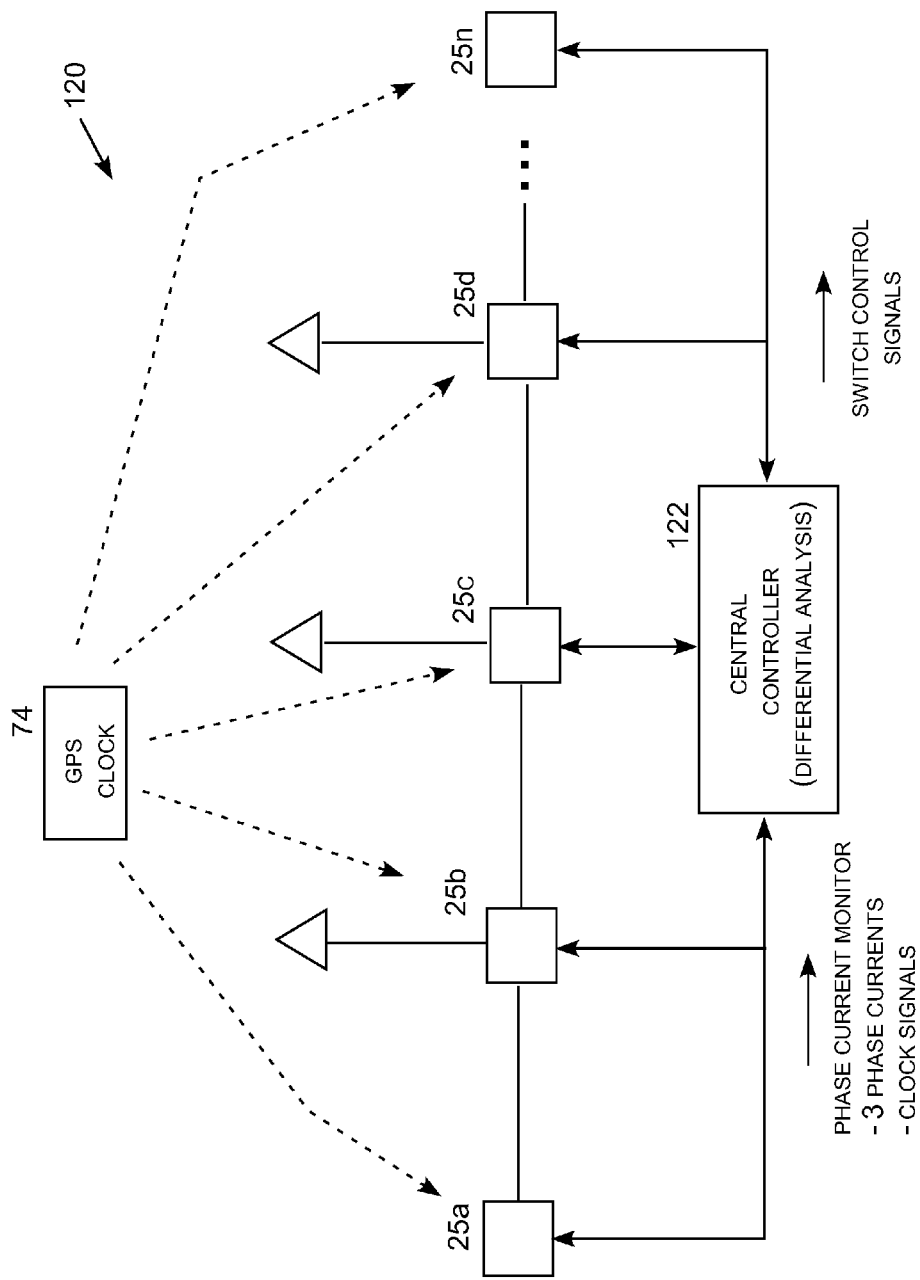
FIG. 12 is a block diagram of a fault detection and isolation system for a power line with multiple tap points utilizing differential current analysis, a common reference clock, and a central controller.

FIG. 12 is a block diagram of another alternative configuration 120 similar to the configuration 110 shown in FIG. 11 except that a reference voltage signal is not utilized. Instead, the central controller 122 utilizes a differential phase current analysis to detect and locate power faults. The specific configuration 120 is only exemplary in that the differential phase current analysis can be performed in any location where current measurements with a common reference clock signal are consolidated for analysis. This approach utilizes the three-phase current measurements and reference clock signal at each tap point to detect and locate faults, which can significantly simply the fault detection logic and equipment required.

Faults detection can be triggered by re-closer operation, an abrupt or transient current change (high Δl/Δt), significant harmonic content or other waveform distortion, or unusual change in the amplitude or phase angle of the phase current may also be detected as triggering events. Low impedance faults (fault current above about 1.5 times normal) are characterized by a current phase shift of approximately 180 degrees across the fault. Once the data logs with common time stamps are consolidated for analysis, the location of a low impedance (high current) fault can therefore be determined by comparing adjacent current phasors and locating a pair of current monitoring points (nodes or stations) where the differential current phasor is approximately 180 degrees, which is sufficient to confirm that a low impedance fault is located in the line section between those two nodes. High impedance faults (fault current below about 1.5 times normal) are characterized by high zero-sequence current content. A high impedance fault can be located by sequencing the phase currents and detecting a high zero-sequence component. These detection rule works for lateral faults as well as trunk line faults. Once the faulted segment is identified, fault isolation is implemented through peer-to-peer or centralized control.

Those skilled in the art will appreciate that the foregoing describes preferred embodiments of the invention and that many adjustments and alterations will be apparent to those skilled in the art within the spirit and scope of the invention as defined by the appended claims.

The invention claimed is:

1. A fault detection and response system for a three phase electric power line having three phase conductors, comprising:
    a reference clock operative for generating a common reference clock signal;
    a current monitoring station comprising a set of three current phase sensors, each electrically coupled to and asynchronously monitoring phase current flowing in an associated phase conductor, each current phase sensor operative for receiving or generating the common reference clock signal and having a data buffer for storing a recent history phase current waveform data file for its associated phase current correlated with the common reference clock signal;
    a reference voltage sensor operative for receiving or generating common the reference clock signal and having a data buffer for storing a recent history voltage waveform data file for the electric power line correlated with the common reference clock signal;
    an event detector operative for event detection of a potential high-impedance fault on the electric power line;
    each current phase sensor and the voltage sensor operative for uploading their recent history phase waveform data files in response to the event detection;
    a controller operative for receiving the recent history waveform data files and computationally analyzing the waveform data files to verify that a high-impedance fault has occurred, identify a faulted phase involved the fault, and determine a location of the fault from the current monitoring station, based in part on the correlation of the waveform data files to each other by the common reference clock signal; and
    the controller further operative to activate one or more switches to isolate the faulted phase based on the detected location of the fault.

2. The fault detection and response system of claim 1, wherein the reference voltage sensor is located remotely from the current monitoring station.

3. The fault detection and response system of claim 1, wherein:
    each current phase sensor comprises an event detector operative for event detection of a potential high-impedance fault on its associated phase conductor of the electric power line;
    each current phase sensor is further operative to send wake-up calls to the other phase current sensors upon event detection and receive wake-up calls from the other phase current sensors upon event detection by those sensors;
    each current phase sensor is further operative to upload its recent history phase current waveform data file in response to event detection or receipt of a wake-up call from another sensor.

4. The fault detection and response system of claim 1, further comprising a remote transmission unit (RTU), and wherein:
    each current phase sensor continuously uploads phase current monitoring data to the RTU, and
    the RTU comprises an event detector operative for event detection of potential high-impedance faults on each phase conductor of the electric power line.

5. The fault detection and response system of claim 4, wherein the RTU is located with a selected current phase sensor.

6. The fault detection and response system of claim 4, further comprising a switch operative for disconnecting the electric power line in response to a switch control signal from the controller, wherein the RTU is located with the switch.

7. The fault detection and response system of claim 1, wherein computationally analyzing the waveform data files comprises sequencing the phase current waveforms.

8. The fault detection and response system of claim 7, wherein computationally analyzing the waveform data files comprises detecting significant zero sequence current content in the sequenced phase current waveforms.

9. The fault detection and response system of claim 1, wherein a remote transmission unit (RTU) at the monitoring location is operative for determining the direction of the high-impedance fault.

10. The fault detection and response system of claim 9, wherein the RTU is located with a selected current phase sensor.

11. A fault detection and response system for a three phase electric power line having three phase conductors, comprising:
    a reference clock operative for generating a common clock reference signal;
    a plurality of electric switch controllers, each operative for controlling an electric power switch for disconnecting the electric power line at a respective location;
    a plurality of current monitoring stations, each associated with each electric switch controller, wherein each current monitoring station comprises a set of three current phase sensors, each electrically connected to and asynchronously monitoring phase current flowing in an associated phase conductor, each current phase sensor having a data buffer for storing a recent history phase current waveform data file for its associated phase current, and each current phase sensor operative for receiving or generating the common reference clock signal and storing the recent history phase current waveform data file correlated with the common reference clock signal;

a reference voltage sensor operative for receiving or generating the common reference clock signal and having a data;

an event detector operative for event detection of a potential high-impedance fault on the electric power line, each current phase sensor and the voltage sensor operative for uploading its recent history waveform data file in response to the event detection;

a controller operative for receiving the recent history waveform data files and computationally analyzing the waveform data files to verify that a high-impedance fault has occurred, identify a faulted phase involved the fault, and determine a location of the fault from each current monitoring station, based in part on the correlation of the waveform data files to each other by the common reference clock signal; and the controller further operative to activate one or more switches to isolate the faulted phase based on the detected location of the fault.

12. The fault detection and response system of claim 11, wherein for each current monitoring station:

each current phase sensor comprises an event detector operative for event detection of a potential high-impedance fault on its associated phase conductor of the electric power line;

each current phase sensor is further operative for sending wake-up calls to the other sensors upon event detection and receiving wake-up calls from the other sensors upon event detection by the other sensors;

each current phase sensor is further operative for uploading its recent history waveform data file in response to event detection or receipt of a wake-up call from another sensor.

13. The fault detection and response system of claim 11, further comprising a remote transmission unit (RTU) for each current monitoring station, and wherein for each current monitoring station:

each current phase sensor continuously uploads phase current monitoring data to the RTU, and the RTU comprises an event detector operative for event detection of potential high-impedance fault on each phase conductor of the electric power line.

14. A method for detecting and responding to faults on an electric power line, comprising:

generating or receiving a common reference clock signal;

locating a plurality of current monitoring stations on the electric power line, each comprising an asynchronous data logging phase current sensor electrically coupled to each phase conductor of the electric power line storing current waveform data for each phase correlated with the common reference clock signal;

generating an event trigger in response to the detection of a potential high-impedance faults on the power line;

uploading the historical phase current and voltage waveform data files from the phase current and voltage sensors in response to an event trigger;

computationally analyzing the waveform data files to verify that a high-impedance fault has occurred, identify a faulted phase involved the fault, and determine a location of the fault from each current monitoring station to identify a faulted line segment, based in part on the correlation of the waveform data files to each other by the common reference clock signal; and controlling the operation of one or more selected switches to isolate the faulted line segment.

15. The method of claim 14, further comprising determining directionality of the fault through differential current phasor analysis between adjacent current monitoring stations on the power line.

16. The method of claim 14, further comprising:

locating a reference voltage sensor remotely from one or more of the current monitoring stations operative for receiving or generating the reference clock signal and having a data buffer for storing a recent history voltage waveform data file for the electric power line correlated with the reference clock signal; and uploading the recent history voltage waveform data file and utilizing the voltage waveform data file in the determination of the direction of the fault from each current monitoring station.

17. The method of claim 16, further comprising utilizing a single data logging voltage angle detector to determine directionality of a fault from multiple current monitoring stations.

18. The method of claim 14, wherein the electric power line includes a main power line and a plurality of tap points, each radially connecting a tapped line section to the main power line, the main power line having a forward direction and a reverse direction, further comprising the steps of:

at each tap point, providing monitoring equipment including a forward side current monitoring device and a reverse side current monitoring device, sectionalizing equipment including a forward side sectionalizing switch and a reverse side sectionalizing switch, equipment for generating or receiving a reference clock signal, and data logging equipment operative for storing recent history phase current waveform files correlated with the reference clock signal, and communication equipment;

wherein the controller comprises communication equipment and processing equipment operative to communicate with the monitoring equipment and the sectionalizing equipment at each tap point, determine directionality of a fault on the power line at each current monitoring device, identify a faulted line section by identifying a change in the directionality of the fault associated with the faulted line section, and operate one or more of the sectionalizing switches to isolate the faulted line section from the circuit.

19. The method of claim 18, further comprising the step of providing a centralized directional fault controller operative to communicate with the monitoring equipment and the sectionalizing equipment at each tap point.

20. The method of claim 18, further comprising the steps of:

providing a plurality of peer-to-peer directional fault controllers, each controlling an associated tap point; and configuring each peer-to-peer directional fault controller to communicate with a peer-to-peer directional fault controller associated with an adjacent tap point in the forward or reverse direction.

* * * * *